United States Patent
Paik et al.

(10) Patent No.: US 11,494,583 B2
(45) Date of Patent: Nov. 8, 2022

(54) METHOD AND DEVICE FOR REINFORCEMENT LEARNING USING NOVEL CENTERING OPERATION BASED ON PROBABILITY DISTRIBUTION

(71) Applicant: SEOUL NATIONAL UNIVERSITY R&DB FOUNDATION, Seoul (KR)

(72) Inventors: Myunghee Cho Paik, Seoul (KR); Gi Soo Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 574 days.

(21) Appl. No.: 16/592,393

(22) Filed: Oct. 3, 2019

(65) Prior Publication Data
US 2020/0110964 A1   Apr. 9, 2020

(30) Foreign Application Priority Data
Oct. 4, 2018 (KR) .................. 10-2018-0118565

(51) Int. Cl.
*G06K 9/62* (2022.01)
*G06N 7/00* (2006.01)

(52) U.S. Cl.
CPC ......... *G06K 9/6226* (2013.01); *G06K 9/6262* (2013.01); *G06K 9/6272* (2013.01); *G06N 7/005* (2013.01)

(58) Field of Classification Search
None
See application file for complete search history.

(56) References Cited

PUBLICATIONS

Greenewald, Kristjan, et al. "Action centered contextual bandits." Advances in neural information processing systems 30 (2017). (Year: 2017).*
Krishnamurthy, Akshay, Zhiwei Steven Wu, and Vasilis Syrgkanis. "Semiparametric contextual bandits." International Conference on Machine Learning. PMLR, 2018. (Year: 2018).*

* cited by examiner

*Primary Examiner* — David Perlman
(74) *Attorney, Agent, or Firm* — Kaplan Breyer Schwarz, LLP

(57) ABSTRACT

A method for reinforcement learning adopting a centering operation using a weight corresponding to a behavior probability is provided. The method includes steps of: a computing device instructing a reinforcement learning agent to (a) determine a k-th estimated parameter by referring to (i) a probability distribution for estimating the k-th behavior if k=1, and (ii) the probability distribution generated by selecting a (k−1)-th behavior if k>1; (b) select one of N behavior candidates as the k-th behavior by referring to (i) the k-th estimated parameter, and (ii) k-th contexts; (c) if k-th behavior probabilities are acquired, (i) generate k-th weighted expectation value of the k-th contexts, and (ii) generate k-th adjusted contexts by applying the centering operation to the k-th contexts; and (d) if a k-th reward is acquired, generate the probability distribution for estimating a (k+1)-th behavior using the k-th adjusted contexts, the k-th behavior probabilities, and the k-th reward.

20 Claims, 3 Drawing Sheets

METHOD AND DEVICE FOR REINFORCEMENT LEARNING USING NOVEL CENTERING OPERATION BASED ON PROBABILITY DISTRIBUTION

FIELD OF THE DISCLOSURE

The present disclosure relates to a method for reinforcement learning adopting a centering operation using a weight corresponding to a behavior probability; and more particularly, to the method for a computing device (a) instructing a reinforcement learning agent to determine a k-th estimated parameter, to be used for allowing the reinforcement learning agent to select a k-th behavior, by referring to (i) a probability distribution for estimating the k-th behavior which is predetermined in case k is 1, and (ii) the probability distribution for estimating the k-th behavior generated by selecting a (k−1)-th behavior in case k is larger than 1, (b) instructing the reinforcement learning agent to select one of N behavior candidates as the k-th behavior by referring to (i) the k-th estimated parameter, and (ii) k-th contexts representing covariates related to the N behavior candidates one of which is selectable by the reinforcement learning agent as the k-th behavior wherein N is an integer larger than 1, (c) if each of k-th behavior probabilities corresponding to each probability of each of the N behavior candidates being selected as the k-th behavior is acquired, instructing the reinforcement learning agent to (i) generate each k-th weighted expectation value of the k-th contexts by using each of the k-th behavior probabilities as the weight, and (ii) generate said each of k-th adjusted contexts by applying the centering operation to each of the k-th contexts by using the k-th weighted expectation value such that an expectation value of result values of the k-th contexts is adjusted, and (d) if a k-th reward for the k-th behavior is acquired, instructing the reinforcement learning agent to generate a probability distribution for estimating a (k+1)-th behavior by using at least part of the k-th adjusted contexts, the k-th behavior probabilities, and the k-th reward, and the computing device using the same.

BACKGROUND OF THE DISCLOSURE

Reinforcement learning, which is a major area of machine learning, is a methodology in which a learner selects a behavior that maximizes a reward from a large number of selectable behaviors within a given environment. The learner repeats processes of selecting the behavior and receiving the reward, accumulates and learns information on a reward mechanism, and selects the behavior that is close to an optimal behavior over time. The areas where the reinforcement learning is mainly used in real life include mobile healthcare systems and advertisement placement algorithms for web pages, etc.

Among various methodologies of the reinforcement learning, the Multi-Armed Bandit Problem is a methodology of the reinforcement learning that focuses on a problem of striking a balance between 'exploitation' which chooses the best behavior indicated by the information accumulated so far, and 'exploration' which chooses a behavior that may not be the best at the moment but may give information helpful for selection in the future.

The Thompson sampling algorithm, first introduced in 1933, is a representative Multi-Armed Bandit algorithm. Agrawal and Goyal (2013) extended the Thomson sampling algorithm to a contextual bandit setting, in which specific information on each behavior at each stage is given as covariates and made available for the exploitation and the exploration. This algorithm assumes that there is a linear relationship between the covariates associated with each behavior at each stage and the reward for the behavior.

$$r_i(k) = b_i(k)^T \mu + \eta_i(k)$$

$b_i(k)$ is a covariate associated with an i-th behavior candidate (i is an integer greater than 0 and equal to or less than N) that may be selected as the k-th behavior, $\mu$ is a parameter estimated by linear regression, and $\eta_i(k)$ is a random error. Each behavior is selected by using a model according to the above equation, and a regret, which is a difference between an optimal reward and the reward of the selected behavior, is accumulated and calculated, and the behavior is selected such that the regret becomes smaller.

The Thomson sampling, however, assumes the linear relationship between the covariates associated with each behavior and each reward associated with the behavior, which is assuming that a distribution of rewards does not change over time, unlike the reality. Thus, Greenewald (2017) assumes a semiparametric additive model and achieves similar performance in more relaxed assumptions. That is, Greenewald (2017) extends the reward model by adding values that change over time but do not depend on types of the behaviors.

$$r_i(k) = v(k) + b_i(k)^T \mu + \eta_i(k)$$

Compared to the model in the Thomson sampling, v(k) is added. As can be seen from the equation, v(k) is a value that changes over time and corresponds to a reward for a base behavior over time, that is, for an absence of the behavior. The covariate Mk) corresponding to the absence of the behavior will be $0_d$. By using this model, however, when the linear regression is applied, although v(k) does not need to be estimated because the optimal behavior does not vary by v(k), v(k) interferes with the estimation of $\mu$. Greenewald (2017) eliminates v(k) from an expectation value of the estimated rewards in the model by replacing the rewards with pseudo rewards which utilizes probabilities.

However, the method proposed by Greenewald (2017) also has a problem that the probabilities must be limited because the constant by which the high probability upper bound of the regret is multiplied diverges if the probabilities approach 0 or 1. By limiting the probabilities, determination of the optimal selection by the reinforcement learning agent is also limited.

Krishnamurthy (2018) uses a reward model such as Greenewald (2017), but adjusts the covariates such that the expectation value of the selected covariates becomes a zero vector by using a centering operation with a specific distribution, thus eliminating v(k) and removing the limit of the probabilities mentioned in Greenewald (2017). However, the algorithm of Krishnamurthy (2018) has a problem in actual implementation due to (i) long execution time of the algorithm caused by added processes of removing behaviors which satisfy specific conditions at each stage and (i) a lack of how the specific distribution is generated.

SUMMARY OF THE DISCLOSURE

It is an object of the present disclosure to solve all the aforementioned problems.

It is another object of the present disclosure to generate more optimized results of reinforcement learning, by adjusting contexts, used in the reinforcement learning, which are covariates corresponding to each of behaviors selectable at each stage through application of a centering operation using weights corresponding to behavior probabilities.

It is still another object of the present disclosure to reduce execution time of an algorithm by eliminating unnecessary processes of determining whether to remove each of the behaviors at each stage, and to simplify implementation by allowing a probability distribution used in selecting a current behavior to be generated in a process of determining a previous behavior.

In order to accomplish objects above and characteristic effects to be described later of the present disclosure, distinctive structures of the present disclosure are described as follows.

In accordance with one aspect of the present disclosure, there is provided a method for reinforcement learning adopting a centering operation using a weight corresponding to a behavior probability, including steps of: (a) a computing device instructing a reinforcement learning agent to determine a k-th estimated parameter, to be used for allowing the reinforcement learning agent to select a k-th behavior, by referring to (i) a probability distribution for estimating the k-th behavior which is predetermined in case k is 1, and (ii) the probability distribution for estimating the k-th behavior generated by selecting a (k−1)-th behavior in case k is larger than 1; (b) the computing device instructing the reinforcement learning agent to select one of N behavior candidates as the k-th behavior by referring to (i) the k-th estimated parameter, and (ii) k-th contexts representing covariates related to the N behavior candidates one of which is selectable by the reinforcement learning agent as the k-th behavior wherein N is an integer larger than 1; (c) the computing device, if each of k-th behavior probabilities corresponding to each probability of each of the N behavior candidates being selected as the k-th behavior is acquired, instructing the reinforcement learning agent to (i) generate each k-th weighted expectation value of the k-th contexts by using each of the k-th behavior probabilities as the weight, and (ii) generate said each of k-th adjusted contexts by applying the centering operation to each of the k-th contexts by using the k-th weighted expectation value such that an expectation value of result values of the k-th contexts is adjusted; and (d) the computing device, if a k-th reward for the k-th behavior is acquired, instructing the reinforcement learning agent to generate a probability distribution for estimating a (k+1)-th behavior by using at least part of the k-th adjusted contexts, the k-th behavior probabilities, and the k-th reward.

As one example, at the step of (b), the reinforcement learning agent determines a certain number a(k) of one of the N behavior candidates from which the k-th behavior is to be selected by using an equation below, $$a(k) := \mathrm{argmax}\ b_i(k)^T \mu(k),\ i \in \{1, \ldots, N\}$$

wherein $\tilde{\mu}(k)$ is the k-th estimated parameter for selecting the k-th behavior, and $b_i(k)$ is one of the k-th contexts representing covariates related to the N behavior candidates and wherein i is an integer larger than 0 and equal to or less than N.

As one example, at the step of (c), the reinforcement learning agent applies the centering operation to the k-th contexts by using an equation below, $$b_{i_c}(k) = b_i(k) - \overline{b}(k)$$

wherein $b_{i_c}(k)$ is one of the k-th adjusted contexts, $b_i(k)$ is one of the k-th contexts, $\overline{b}(k)$ is the k-th weighted expectation value, and i is an integer larger than 0 and equal to or less than N.

As one example, at the step of (c), the reinforcement learning agent calculates the k-th weighted expectation value by using an equation below, $$\overline{b}(k) = \Sigma_{i=1}^N \pi_i(k) b_i(k)$$

wherein $\pi_i(k)$ is one, corresponding to an i-th behavior candidate, among the k-th behavior probabilities, and $b_i(k)$ is one of the k-th contexts.

As one example, at the step of (d), the reinforcement learning agent (i) adjusts a k-th regression parameter matrix by using at least part of the k-th adjusted contexts and the k-th behavior probabilities, to thereby generate a (k+1)-th regression parameter matrix, (ii) adjusts a k-th dependent variable by using at least part of the k-th adjusted contexts and the k-th reward, to thereby generate a (k+1)-th dependent variable, and (iii) generates the probability distribution for estimating the (k+1)-th behavior by referring to the (k+1)-th regression parameter matrix and the (k+1)-th dependent variable, and wherein the k-th regression parameter matrix is a matrix formed by regression parameters to be used for linear regression estimation, and the k-th dependent variable is to be estimated by the linear regression estimation.

As one example, the reinforcement learning agent adjusts the k-th regression parameter matrix by using an equation below, $$B_{k+1} = B_k + 2 b_{a(k)_c}(k) \times b_{a(k)_c}(k)^T + 2 \Sigma_{i=1}^N \pi_i(k) \times b_{i_c}(k) \times b_{i_c}(k)^T$$

wherein $B_{k+1}$ is the (k+1)-th regression parameter matrix, $B_k$ is the k-th regression parameter matrix before being adjusted, $b_{a(k)_c}(k)$ is one of the k-th adjusted contexts corresponding to the selected k-th behavior, $\pi_i(k)$ is one, corresponding to an i-th behavior candidate, among the k-th behavior probabilities, and $b_{i_c}(k)$ is one, of the i-th behavior candidate, among the k-th adjusted contexts.

As one example, a first regression parameter matrix in case k is 1 is a unit matrix with a dimension identical to that of 1-st contexts.

As one example, the reinforcement learning agent adjusts the k-th dependent variable by using an equation below, $$y_{k+1} = y_k + 4 b_{a(k)_c}(k) \times r_{a(k)}(k)$$

wherein $y_{k+1}$ is the (k+1)-th dependent variable, $y_k$ is the k-th dependent variable before being adjusted, $b_{a(k)_c}(k)$ is one among the k-th adjusted contexts corresponding to the k-th behavior, and $r_{a(k)}(k)$ is the k-th reward corresponding to the k-th behavior.

As one example, a first dependent variable in case k is 1 is a zero vector with a dimension identical to that of 1-st contexts.

As one example, at the step of (d), the reinforcement learning agent generates the probability distribution for estimating the (k+1)-th behavior by using an equation below, $$N_{k+1} = N(\hat{\mu}_{k+1}, \sigma^2 B_{k+1}^{-1})\ \text{when}\ \hat{\mu}_{k+1} = B_{k+1}^{-1} y_{k+1}$$

wherein $B_{k+1}$ is the (k+1)-th regression parameter matrix, $y_{k+1}$ is the (k+1)-th dependent variable, and $\sigma$ is a preset variance-adjusting value related to a degree of exploration.

In accordance with another aspect of the present disclosure, there is provided a computing device for reinforcement learning adopting a centering operation using a weight corresponding to a behavior probability, including: at least one memory that stores instructions; and at least one processor configured to execute the instructions to perform processes of (I) instructing a reinforcement learning agent to determine a k-th estimated parameter, to be used for allowing the reinforcement learning agent to select a k-th behavior, by referring to (i) a probability distribution for estimating the k-th behavior which is predetermined in case k is 1, and (ii) the probability distribution for estimating the k-th behavior generated by selecting a (k−1)-th behavior in case k is larger than 1, (II) instructing the reinforcement learning agent to select one of N behavior candidates as the k-th behavior by referring to (i) the k-th estimated parameter, and (ii) k-th contexts representing covariates related to the N behavior candidates one of which is selectable by the reinforcement learning agent as the k-th behavior wherein N is an integer larger than 1, (III) if each of k-th behavior probabilities corresponding to each probability of each of the N behavior candidates being selected as the k-th behavior is acquired, instructing the reinforcement learning agent to (i) generate each k-th weighted expectation value of the k-th contexts by using each of the k-th behavior probabilities as the weight, and (ii) generate said each of k-th adjusted contexts by applying the centering operation to each of the k-th contexts by using the k-th weighted expectation value such that an expectation value of result values of the k-th contexts is adjusted, and (IV) if a k-th reward for the k-th behavior is acquired, instructing the reinforcement learning agent to generate a probability distribution for estimating a (k+1)-th behavior by using at least part of the k-th adjusted contexts, the k-th behavior probabilities, and the k-th reward.

As one example, at the process of (II), the reinforcement learning agent determines a certain number a(k) of one of the N behavior candidates from which the k-th behavior is to be selected by using an equation below, $$a(k) := \mathrm{argmax}\ b_i(k)^T \tilde{\mu}(k),\ i \in \{1, \ldots N\}$$

wherein $\tilde{\mu}(k)$ is the k-th estimated parameter for selecting the k-th behavior, and $b_i(k)$ is one of the k-th contexts representing covariates related to the N behavior candidates and wherein i is an integer larger than 0 and equal to or less than N.

As one example, at the process of (III), the reinforcement learning agent applies the centering operation to the k-th contexts by using an equation below, $$b_{i_c}(k) = b_i(k) - \bar{b}(k)$$

wherein $b_{i_c}(k)$ is one of the k-th adjusted contexts, $b_i(k)$ is one of the k-th contexts, $\bar{b}(k)$ is the k-th weighted expectation value, and i is an integer larger than 0 and equal to or less than N.

As one example, at the process of (III), the reinforcement learning agent calculates the k-th weighted expectation value by using an equation below, $$\bar{b}(k) = \Sigma_{i=1}^N \pi_i(k) b_i(k)$$

wherein $\pi_i(k)$ is one, corresponding to an i-th behavior candidate, among the k-th behavior probabilities, and $b_i(k)$ is one of the k-th contexts.

As one example, at the process of (IV), the reinforcement learning agent (i) adjusts a k-th regression parameter matrix by using at least part of the k-th adjusted contexts and the k-th behavior probabilities, to thereby generate a (k+1)-th regression parameter matrix, (ii) adjusts a k-th dependent variable by using at least part of the k-th adjusted contexts and the k-th reward, to thereby generate a (k+1)-th dependent variable, and (iii) generates the probability distribution for estimating the (k+1)-th behavior by referring to the (k+1)-th regression parameter matrix and the (k+1)-th dependent variable, and wherein the k-th regression parameter matrix is a matrix formed by regression parameters to be used for linear regression estimation, and the k-th dependent variable is to be estimated by the linear regression estimation.

As one example, the reinforcement learning agent adjusts the k-th regression parameter matrix by using an equation below, $$B_{k+1} = B_k + 2 b_{a(k)_c}(k) \times b_{a(k)_c}(k)^T + 2 \Sigma_{i=1}^N \pi_i(k) \times b_{i_c}(k) \times b_{i_c}(k)^T$$

wherein $B_{k+1}$ is the (k+1)-th regression parameter matrix, $B_k$ is the k-th regression parameter matrix before being adjusted, $b_{a(k)_c}(k)$ is one of the k-th adjusted contexts corresponding to the selected k-th behavior, $\pi_i(k)$ is one, corresponding to an i-th behavior candidate, among the k-th behavior probabilities, and $b_{i_c}(k)$ is one, of the i-th behavior candidate, among the k-th adjusted contexts, corresponding to the k-th behavior.

As one example, a first regression parameter matrix in case k is 1 is a unit matrix with a dimension identical to that of 1-st contexts.

As one example, the reinforcement learning agent adjusts the k-th dependent variable by using an equation below, $$y_{k+1} = y_k + 4 b_{a(k)_c}(k) \times r_{a(k)}(k)$$

wherein $y_{k+1}$ is the (k+1)-th dependent variable, $y_k$ is the k-th dependent variable before being adjusted, $b_{a(k)_c}(k)$ is one among the k-th adjusted contexts corresponding to the k-th behavior, and $r_{a(k)}(k)$ is the k-th reward corresponding to the k-th behavior.

As one example, a first dependent variable in case k is 1 is a zero vector with a dimension identical to that of 1-st contexts.

As one example, at the process of (IV), the reinforcement learning agent generates the probability distribution for estimating the (k+1)-th behavior by using an equation below, $$N_{k+1} = N(\hat{\mu}_{k+1}, \sigma^2 B_{k+1}^{-1})\ \text{when}\ \hat{\mu}_{k+1} = B_{k+1}^{-1} y_{k+1}$$

wherein $B_{k+1}$ is the (k+1)-th regression parameter matrix, $y_{k+1}$ is the (k+1)-th dependent variable, and $\sigma$ is a preset variance-adjusting value related to a degree of exploration.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
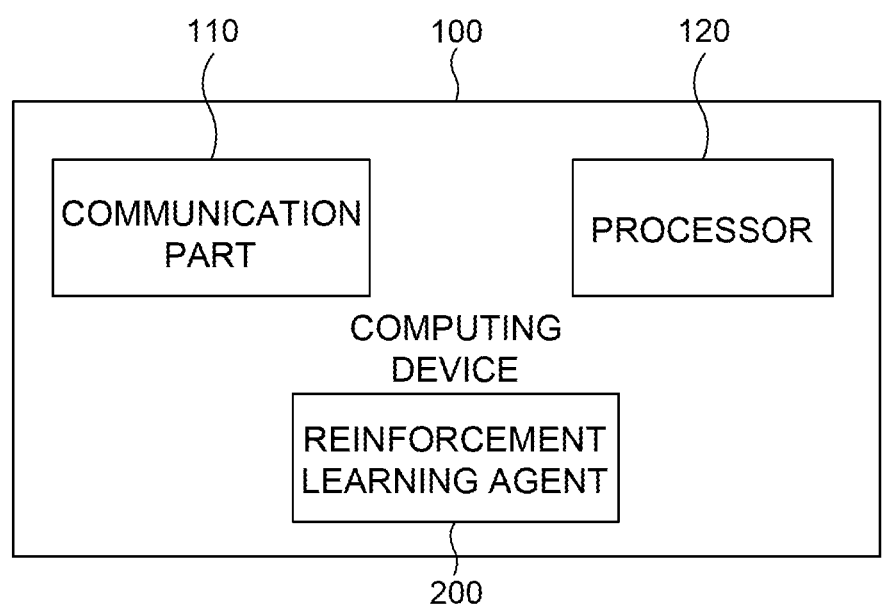
FIG. 1 is a drawing schematically illustrating a configuration of a computing device performing a method for reinforcement learning adopting a centering operation using weights corresponding to behavior probabilities in accordance with the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically illustrating a configuration of a computing device performing a method for reinforcement learning adopting a centering operation using weights corresponding to behavior probabilities in accordance with the present disclosure.

By referring to FIG. 1, the computing device 100 may include a reinforcement learning agent 200. Processes of the reinforcement learning agent 200 may be performed respectively by a communication part 110 and a processor 120. However, detailed communication schematics between the communication part 110 and the processor 120 are omitted in FIG. 1.

Figure 2:
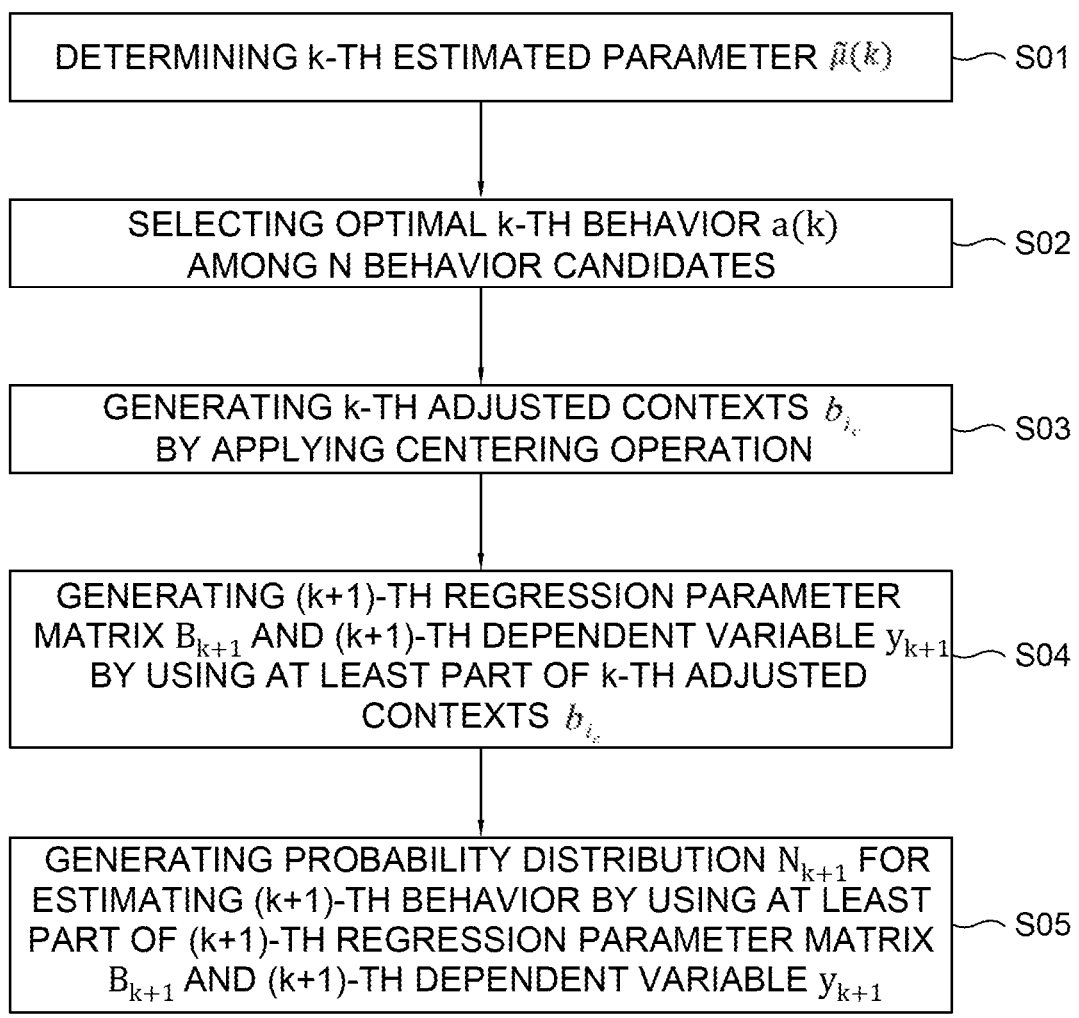
FIG. 2 is a flow chart schematically illustrating the method for the reinforcement learning in accordance with one example embodiment of the present disclosure.

The configuration of the computing device 100 in accordance with the present disclosure is described above, and the method for the reinforcement learning in accordance with one example embodiment of the present disclosure is described by referring to FIG. 2.

FIG. 2 is a flow chart schematically illustrating the method for the reinforcement learning in accordance with one example embodiment of the present disclosure.

By referring to FIG. 2, the processor 120 may instruct the reinforcement learning agent 200 to determine a k-th estimated parameter $\tilde{\mu}(k)$, at a step of S01, to be used for allowing the reinforcement learning agent 200 to select a k-th behavior by referring to (i) a probability distribution for estimating the k-th behavior which may be predetermined in case k is 1, and (ii) the probability distribution for estimating the k-th behavior generated by selecting a (k−1)-th behavior in case k is larger than 1.

And, the processor 120 may instruct the reinforcement learning agent 200 to select a certain number a(k) of one of N behavior candidates by referring to (i) the k-th estimated parameter, and (ii) k-th contexts representing covariates related to the N behavior candidates one of which is selectable by the reinforcement learning agent as the k-th behavior, to thereby determine a specific behavior candidate corresponding to the certain number a(k) as the k-th behavior at a step of S02. Herein N is an integer larger than 1.

Thereafter, if each of k-th behavior probabilities, corresponding to each probability of each of the N behavior candidates being selected as the k-th behavior, is acquired, the processor 120 may instruct the reinforcement learning agent 200 to (i) generate a k-th weighted expectation value of the k-th contexts by using each of the k-th behavior probabilities as the weight, and (ii) generate said each of k-th adjusted contexts $b_{i_c}$ by applying the centering operation to each of the k-th contexts by using the k-th weighted expectation value such that the expectation value of result values of the k-th contexts is adjusted, at a step of S03. Throughout the present disclosure, the "expection value" may mean an "average value", but the scope of the present disclosure is not limited thereto.

And, if a k-th reward for the k-th behavior is acquired, the processor 120 may instruct the reinforcement learning agent 200 to generate a probability distribution for estimating a (k+1)-th behavior by using at least part of the k-th adjusted contexts, the k-th behavior probabilities, and the k-th reward, at steps of S04 and S05. By using the probability distribution for estimating the (k+1)-th behavior generated as such to determine the (k+1)-th behavior which is a next behavior, the next behavior may be determined using a probability distribution created by its previous behavior.

The method for the reinforcement learning in accordance with one example of the present disclosure is described above, and each of the processes is described in detail below.

First, if the reinforcement learning agent 200 selects a 1-st behavior, i.e., an initial behavior, a 1-st estimated parameter may be determined by referring to a predetermined probability distribution for estimating the 1-st behavior. The probability distribution for estimating the 1-st behavior may be a normal distribution whose average is a zero vector having a dimension identical to that of 1-st contexts and whose variance is $\sigma^2 \times I_d$. Herein, a is a predetermined variance-adjusting value.

a may be calculated by an equation below.

$$\sigma = R\sqrt{d \times \log(T) \times \log(1/\delta)}$$

In the above equation, R may be a standard deviation of errors, d may be at least one dimension of the contexts, T may be the number of the behaviors to be selected for learning, and δ may be a constant corresponding to a reliability of a regret. Herein, the regret may be a value representing difference between an optimal reward and each reward corresponding to the behaviors selected by the reinforcement learning agent 200.

When selecting the k-th behavior other than the 1-st behavior, the reinforcement learning agent 200 may determine the k-th estimated parameter by referring to the probability distribution for estimating the k-th behavior generated by selecting the (k−1)-th behavior. The probability distribution for estimating the k-th behavior may be a normal distribution whose average and variance are determined by selecting the (k−1)-th behavior, and a process of determining the average and the variance will be described in detail later.

If the k-th estimated parameter is determined as above, the reinforcement learning agent 200 may determine the certain number a(k) of one of the N behavior candidates from which the k-th behavior is to be selected by using an equation below, $$a(k) := \mathrm{argmax}\; b_i(k)^T \tilde{\mu}(k),\; i \in \{1, \ldots, N\}$$

Herein, $\tilde{\mu}(k)$ may be the k-th estimated parameter to be used for selecting the k-th behavior, and $b_i(k)$ may be one of the k-th contexts representing covariates related to the N behavior candidates and i may be an integer larger than 0 and equal to or less than N. The argmax function is a well-known function for finding a value of i which maximizes a result, i.e., $b_i(k)^T \tilde{\mu}(k)$, of multiplication of the k-th estimated parameter by an i-th member of the k-th contexts. The reason of finding the value of i maximizing the $b_i(k)^T \tilde{\mu}(k)$ is that the reward may be estimated as larger if the result of the multiplication is larger, since a reward estimation is modeled by $r_i(k) = v(k) + b_i(k)^T \mu + \eta_i(k)$. That is, a(k) of the above equation may represent an ordinal number of a single behavior candidate estimated as having a largest reward among the N behavior candidates from which the k-th behavior is to be selected, and as a result, the k-th behavior may be determined. If the k-th behavior is determined, the computing device 100 may perform the k-th behavior and may acquire the k-th reward as a result.

After the k-th behavior is determined, the reinforcement learning agent 200 may apply the centering operation to each of the k-th contexts, and because the k-th weighted expectation value is required for the centering operation, a process of calculating the k-th weighted expectation value is described below.

In parallel with the aforementioned processes, the computing device 100 may acquire each of the k-th behavior probabilities corresponding to each of the probabilities of each of the N behavior candidates being selected as the k-th behavior. That is, $\pi_i(k)$, which is the k-th behavior probability of the i-th behavior candidate, may be calculated by using a normal distribution of $\tilde{\mu}(k)$. This may be calculated by the processor 120 inside the computing device 100, however, may be received via the communication part 110 from an external calculation module (not illustrated).

If the k-th behavior probabilities are acquired as above, the computing device 100 may instruct the reinforcement learning agent 200 to generate the k-th weighted expectation value, by multiplying each of the k-th contexts by each of the k-th behavior probabilities (as each of weights) and summing their results. This is shown in an equation below.

$$\bar{b}(k) = \Sigma_{i=1}^{N} \pi_i(k) b_i(k)$$

If the k-th weighted expectation value is generated as above, the reinforcement learning agent 200 may apply the centering operation to the k-th contexts using an equation below.

$$b_{i_c}(k) = b_i(k) - \bar{b}(k)$$

Herein, $b_{i_c}(k)$ may be one of the k-th adjusted contexts, $b_i(k)$ may be one of the k-th contexts, $\bar{b}(k)$ may be the k-th weighted expectation value, and i may be an integer larger than 0 and equal to or less than N. The purpose of applying the centering operation is to eliminate v(k) from the model, as described in the explanation of conventional art. A proof of eliminating v(k) is as follows.

$$E[\{b_{a(k)}(k) - \bar{b}(k)\}r_{a(k)}(k)] = E\left[\sum_{i=1}^{N}\{I(a(k)=i)\}\{b_i(k) - \bar{b}(k)\}r_i(k)\right] =$$

$$E\left[\sum_{i=1}^{N}\{I(a(k)=i)\}\{b_i(k) - \bar{b}(k)\}\{v(k) + b_i(k)^T u\}\right] =$$

$$v(k)\sum_{i=1}^{N}\pi_i(k)\{b_i(k) - \bar{b}(k)\} + \sum_{i=1}^{N}\pi_i(k)\{b_i(k) - \bar{b}(k)\}b_i(k)^T \mu =$$

$$v(k)\{\bar{b}(k) - \bar{b}(k)\} + \sum_{i=1}^{N}\pi_i(k)\{b_i(k) - \bar{b}(k)\}b_i(k)^T \mu =$$

$$\sum_{i=1}^{N}\pi_i(k)\{b_i(k) - \bar{b}(k) - \bar{b}(k)\}b_i(k)^T \mu$$

By referring to the above equations, v(k) is shown as eliminated at the last step. Therefore, the probability distribution for estimating the (k+1)-th behavior to be used for selecting the next behavior may be acquired, by using a result $b_{i_c}(k) = b_i(k) - \bar{b}(k)$, i.e., the k-th adjusted contexts, of the centering operation, the k-th behavior probabilities, and the k-th reward acquired as a result from the k-th behavior.

The k-th reward as such may be acquired via the communication part 110, or may be acquired from calculation of data, received via the communication part 110, by the processor 120.

The reinforcement learning agent 200 may (i) adjust a k-th regression parameter matrix by using at least part of the k-th adjusted contexts and the k-th behavior probabilities, to thereby generate a (k+1)-th regression parameter matrix, (ii) adjust a k-th dependent variable by using at least part of the k-th adjusted contexts and the k-th reward, to thereby generate a (k+1)-th dependent variable, and (iii) generate the probability distribution for estimating the (k+1)-th behavior by referring to the (k+1)-th regression parameter matrix and the (k+1)-th dependent variable, and these processes are described in detail below.

First, the regression parameter matrix may be a matrix formed by regression parameters to be used for linear regression estimation. This may be adjusted by using the adjusted contexts and the behavior probabilities, and may be calculated by an equation below if k is larger than 1.

$$B_{k+1} = B_k + 2b_{a(k)_c}(k) \times b_{a(k)_c}(k)^T + 2\Sigma_{i=1}^{N}\pi_i(k) \times b_{i_c}(k) \times b_{i_c}(k)^T$$

Herein, $B_{k+1}$ may be the (k+1)-th regression parameter matrix, $B_k$ may be the k-th regression parameter matrix before being adjusted, $b_{a(k)_c}(k)$ may be one of the k-th adjusted contexts which corresponds to the selected k-th behavior, $\pi_i(k)$ may be one among the k-th behavior probabilities which is of the i-th behavior candidate, and $b_{i_c}(k)$ may be one among the k-th adjusted contexts which is of the i-th behavior candidate. If k is 1, a unit matrix having a dimension identical to that of the 1-st contexts may be generated as a first regression parameter matrix. Meanwhile, the dependent variable may be a variable to be estimated by the linear regression estimation. This may be adjusted by using the adjusted contexts and the reward, and may be calculated by an equation below if k is larger than 1.

$$y_{k+1} = y_k + 4b_{a(k)_c}(k) \times r_{a(k)}(k)$$

Herein, $y_{k+1}$ may be the (k+1)-th dependent variable, $y_k$ may be the k-th dependent variable before being adjusted, $b_{a(k)_c}(k)$ may be one among the k-th adjusted contexts which corresponds to the k-th behavior, and $r_{a(k)}(k)$ may be the k-th reward corresponding to the k-th behavior. If k is 1, the zero vector having the dimension identical to that of the 1-st contexts may be generated as a first dependent variable.

If the (k+1)-th regression parameter matrix and the (k+1)-th dependent variable are generated as above, the reinforcement learning agent 200 may generate the probability distribution for estimating the (k+1)-th behavior by using an equation below, $$N_{k+1} = N(\hat{\mu}_{k+1}, \sigma^2_{k+1}{}^{-1}), \hat{\mu}_{k+1} = B_{k+1}^{-1} y_{k+1}$$

Herein, $B_{k+1}$ may be the (k+1)-th regression parameter matrix, $y_{k+1}$ may be the (k+1)-th dependent variable, and a may be the predetermined variance-adjusting value as aforementioned.

If the probability distribution for estimating the (k+1)-th behavior is generated according to the equation above, and if the (k+1)-th behavior is required, the computing device 100 may instruct the reinforcement learning agent 200 to determine a (k+1)-th estimated parameter by using the probability distribution for estimating the (k+1)-th behavior, may repeat the above processes to determine the (k+1)-th behavior, and may generate a probability distribution for estimating a (k+2)-th behavior.

The method for the reinforcement learning in accordance with one example of the present disclosure is described above, and effects of the present disclosure are described below by referring to FIG. 3.

Figure 3:
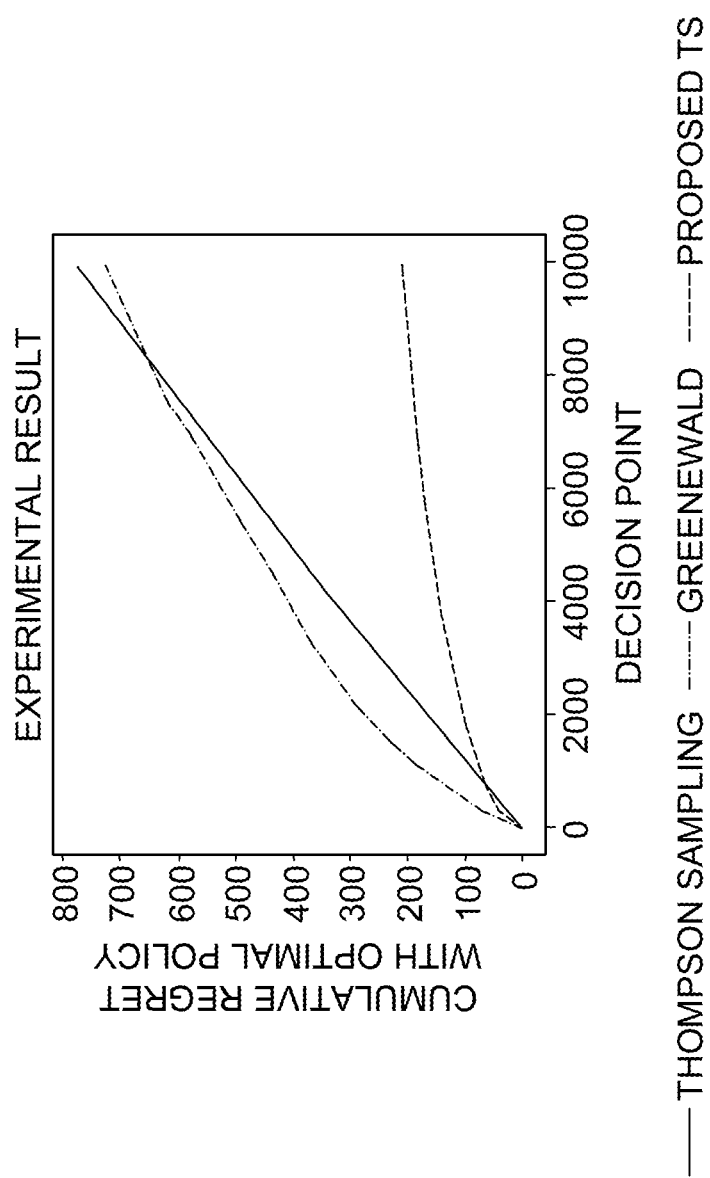
FIG. 3 is a graph comparing experiment results of the reinforcement learning of Thompson sampling, Greenewald (2017), and the present disclosure.

FIG. 3 is a graph comparing experiment results of the reinforcement learning of Thompson sampling, Greenewald (2017), and the present disclosure.

By referring to FIG. 3, a vertical axis may represent accumulated values of the regret which is a difference between each reward and the optimal reward, and a horizontal axis may represent time. Also, a solid line represents a result of the Thompson sampling, a dash-dotted line represents a result of Greenewald (2017), and a dashed line represents a result in accordance with one example embodiment of the present disclosure.

In the experiment, the number N of the N behavior candidates for the k-th behavior is set as six, a dimension d of the k-th contexts is set as ten, the reward to be observed follows the equation $r_i(k) = v(k) + b_i(k)^T \mu + \eta_i(k)$ of the model, and the random error $\eta_i(k)$ follows a normal distribution whose average is zero and whose standard deviation is 0.1. Also, the reward $v(k)$ for the base behavior is determined by $v(k) = -0.5 \times \mathrm{argmax}_i\{b_i(k)^T \mu\}$. Also, actual values of $\mu$ to be estimated are set as [−0.55, 0.666, −0.99, −0.232, 0.55, −0.666, 0.09, 0.232, −0.244]. The simulation is iterated 30 times, and each value on the graph corresponds to each median of the regret of each simulation.

Herein, since the vertical axis represents the accumulated values of the regret, gradual decrease in an increasing rate of the accumulated values of the regret, which causes decrease in the regret for each selected behavior, represents better learning. From this perspective, the Thompson sampling shows inefficient learning since the increasing rate of the accumulated values of the regret does not show any changes. Greenewald (2017) shows slow learning since the increasing rate of the regret is initially sharp compared to the Thompson sampling but the increasing rate of the regret decreases at later times. In contrast, one example embodiment of the present disclosure shows a graph nearly horizontal compared to other conventional learning methods, since the increasing rate of the regret is kept at small amounts except for earliest times and the increasing rate is gradually decreasing.

That is, the method in accordance with one example embodiment of the present disclosure is very efficient in that learning is fast. Also, unlike Krishnamurthy (2018), the execution time of the algorithm is short and efficiently utilized due to elimination of determining on the behavior candidates, and implementation may be simple since the probability distribution for estimating the (k+1)-th behavior is generated as a by-product of aforementioned processes of selecting the k-th behavior.

The present disclosure distinguishes itself from the conventional arts in that (i) the k-th behavior probabilities $\pi_i(k)$ determined from the probability distribution of the k-th estimated parameter $\hat{\mu}(k)$ for the k-th behavior, in accordance with the present disclosure. A weighted expectation value of the k-th contexts is calculated by using the k-th behavior probabilities, and then the k-th adjusted contexts are generated by applying the centering operation thereto. As a result, $v(k)$ is eliminated which must be removed from a reward estimation model when calculating an expectation value $\hat{\mu}(k+1)$ of the probability distribution for estimating the (k+1)-th behavior. Also, the present disclosure differs from the conventional arts in that (ii) the (k+1)-th regression parameter matrix $B_{k+1}$, to be used for the variance of the probability distribution for estimating the (k+1)-th behavior, is calculated by using the weights and the adjusted contexts. As a result, the distribution $N(\hat{\mu}(k+1), \sigma^2 B_{k+1}^{-1})$ of the (k+1)-th estimated parameter $\hat{\mu}(k+1)$ is determined by the k-th behavior probabilities, the k-th adjusted contexts, and the (k+1)-th regression parameter matrix in accordance with the present disclosure which are different from the conventional art.

The present disclosure has an effect of generating more optimized results of the reinforcement learning, by adjusting the contexts, used in the reinforcement learning, which are the covariates corresponding to each of the behaviors selectable at each stage through applying the centering operation using the weights corresponding to the behavior probabilities.

The present disclosure has another effect of reducing the execution time of the algorithm by eliminating processes of determining whether to remove each of the behaviors at each stage, and to simplify the implementation by allowing a probability distribution used in selecting a behavior to be generated in a process of determining the previous behavior.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a machine learning system, the method comprising:
   (a) a computing device instructing a reinforcement learning agent of the machine learning system to determine a k-th estimated parameter, to be used for allowing the reinforcement learning agent to select a k-th behavior, by referring to (i) a probability distribution for estimating the k-th behavior which is predetermined in case k is 1, and (ii) the probability distribution for estimating the k-th behavior generated by selecting a (k−1)-th behavior in case k is larger than 1;

(b) the computing device instructing the reinforcement learning agent to select one of N behavior candidates as the k-th behavior by referring to (i) the k-th estimated parameter, and (ii) k-th contexts representing covariates related to the N behavior candidates one of which is selectable by the reinforcement learning agent as the k-th behavior wherein N is an integer larger than 1;

(c) the computing device, if each of k-th behavior probabilities corresponding to each probability of each of the N behavior candidates being selected as the k-th behavior is acquired, instructing the reinforcement learning agent to (i) generate each k-th weighted expectation value of the k-th contexts based on the k-th behavior probabilities, and (ii) generate said each of k-th adjusted contexts by applying a centering operation to each of the k-th contexts by using the k-th weighted expectation value such that an expectation value of result values of the k-th contexts is adjusted; and (d) the computing device, if a k-th reward for the k-th behavior is acquired, instructing the reinforcement learning agent to generate a probability distribution for estimating a (k+1)-th behavior by using at least part of the k-th adjusted contexts, the k-th behavior probabilities, and the k-th reward;

wherein the reinforcement learning agent adjusts the k-th contexts which are the covariates corresponding to the k-th behavior selectable through application of the centering operation using the k-th weighted expectation values corresponding to the k-th behavior probabilities to reduce execution time by eliminating unnecessary processes of determining whether to remove the k-th behavior.

2. The method of claim 1, wherein the reinforcement learning agent determines a number a(k) of one of the N behavior candidates from which the k-th behavior is to be selected by using an equation $$a(k) := \mathrm{argmax}\ b_i(k)^T \tilde{\mu}(k), i \in \{1, \ldots, N\};$$

wherein $\tilde{\mu}(k)$ is the k-th estimated parameter for selecting the k-th behavior, $b_i(k)$ is one of the k-th contexts representing covariates related to the N behavior candidates, and i is an integer larger than 0 and equal to or less than N.

3. The method of claim 1, wherein the reinforcement learning agent applies the centering operation to the k-th contexts by using an equation $$b_{i_c}(k) = b_i(k) - \bar{b}(k);$$

wherein $b_{i_c}(k)$ is one of the k-th adjusted contexts, $b_i(k)$ is one of the k-th contexts, $\bar{b}(k)$ is the k-th weighted expectation value, and i is an integer larger than 0 and equal to or less than N.

4. The method of claim 1, wherein the reinforcement learning agent calculates the k-th weighted expectation value by using an equation $$\bar{b}(k) = \Sigma_{i=1}^{N} \pi_i(k) b_i(k);$$

wherein $\pi_i(k)$ is one, corresponding to an i-th behavior candidate, among the k-th behavior probabilities, and $b_i(k)$ is one of the k-th contexts.

5. The method of claim 1, wherein the reinforcement learning agent (i) adjusts a k-th regression parameter matrix by using at least part of the k-th adjusted contexts and the k-th behavior probabilities, to thereby generate a (k+1)-th regression parameter matrix, (ii) adjusts a k-th dependent variable by using at least part of the k-th adjusted contexts and the k-th reward, to thereby generate a (k+1)-th dependent variable, and (iii) generates the probability distribution for estimating the (k+1)-th behavior by referring to the (k+1)-th regression parameter matrix and the (k+1)-th dependent variable; and wherein the k-th regression parameter matrix is a matrix formed by regression parameters to be used for linear regression estimation, and the k-th dependent variable is to be estimated by the linear regression estimation.

6. The method of claim 5, wherein the reinforcement learning agent adjusts the k-th regression parameter matrix by using an equation $$B_{k+1} = B_k + 2 b_{a(k)_c}(k) \times b_{a(k)_c}(k)^T + 2 \Sigma_{i=1}^{N} \pi_i(k) \times b_{i_c}(k) \times b_{i_c}(k)^T;$$

wherein $B_{k+1}$ is the (k+1)-th regression parameter matrix, $B_k$ is the k-th regression parameter matrix before being adjusted, $b_{a(k)_c}(k)$ is one of the k-th adjusted contexts corresponding to the selected k-th behavior, $\pi_i(k)$ is one, corresponding to an i-th behavior candidate, among the k-th behavior probabilities, and $b_{i_c}(k)$ is one, of the i-th behavior candidate, among the k-th adjusted contexts.

7. The method of claim 6, wherein when k equals one a first regression parameter matrix is a unit matrix with a dimension identical to that of 1-st contexts.

8. The method of claim 5, wherein the reinforcement learning agent adjusts the k-th dependent variable by using an equation $$y_{k+1} = y_k + 4 b_{a(k)_c}(k) \times r_{a(k)}(k);$$

wherein $y_{k+1}$ is the (k+1)-th dependent variable, $y_k$ is the k-th dependent variable before being adjusted, $b_{a(k)_c}(k)$ is one among the k-th adjusted contexts corresponding to the k-th behavior, and $r_{a(k)}(k)$ is the k-th reward corresponding to the k-th behavior.

9. The method of claim 8, wherein when k equals one a first dependent variable is a zero vector with a dimension identical to that of 1-st contexts.

10. The method of claim 5, wherein the reinforcement learning agent generates the probability distribution for estimating the (k+1)-th behavior by using an equation $$N_{k+1} = N(\hat{\mu}_{k+1}, \sigma^2 B_{k+1}^{-1})\ \text{when}\ \hat{\mu}_{k+1} = B_{k+1}^{-1} y_{k+1};$$

wherein $B_{k+1}$ is the (k+1)-th regression parameter matrix, $y_{k+1}$ is the (k+1)-th dependent variable, and $\sigma$ is a preset variance-adjusting value related to a degree of exploration.

11. A computing device for training a machine learning system, the computing device comprising:

at least one memory that stores instructions; and at least one processor configured to execute the instructions to (I) instruct a reinforcement learning agent of the machine learning system to determine a k-th estimated parameter, to be used for allowing the reinforcement learning agent to select a k-th behavior, by referring to (i) a probability distribution for estimating the k-th behavior which is predetermined in case k is 1, and (ii) the probability distribution for estimating the k-th behavior generated by selecting a (k−1)-th behavior in case k is larger than 1, (II) instruct the reinforcement learning agent to select one of N behavior candidates as the k-th behavior by referring to (i) the k-th estimated parameter, and (ii) k-th contexts representing covariates related to the N behavior candidates one of which is selectable by the reinforcement learning agent as the k-th behavior wherein N is an integer larger than 1, (III) if each of k-th behavior probabilities corresponding to each probability of each of the N behavior candidates being selected as the k-th behavior is acquired, instruct the reinforcement learning agent to (i) generate each k-th weighted expectation value of the k-th contexts based on the k-th behavior probabilities as the weight, and (ii) generate said each of k-th adjusted contexts by applying a centering operation to each of the k-th contexts by using the k-th weighted expectation value such that an expectation value of result values of the k-th contexts is adjusted, and (IV) if a k-th reward for the k-th behavior is acquired, instruct the reinforcement learning agent to generate a probability distribution for estimating a (k+1)-th behavior by using at least part of the k-th adjusted contexts, the k-th behavior probabilities, and the k-th reward; wherein the reinforcement learning agent adjusts the k-th contexts which are the covariates corresponding to the k-th behavior selectable through application of the centering operation using the k-th weighted expectation values corresponding to the k-th behavior probabilities to reduce execution time by eliminating unnecessary processes of determining whether to remove the k-th behavior.

12. The computing device of claim 11, wherein the reinforcement learning agent determines a number a(k) of one of the N behavior candidates from which the k-th behavior is to be selected by using an equation $$a(k) := \mathrm{argmax}\ b_i(k)^T \tilde{\mu}(k),\ i \in \{1, \ldots, N\};$$

wherein $\tilde{\mu}(k)$ is the k-th estimated parameter for selecting the k-th behavior, $b_i(k)$ is one of the k-th contexts representing covariates related to the N behavior candidates, and i is an integer larger than 0 and equal to or less than N.

13. The computing device of claim 11, wherein the reinforcement learning agent applies the centering operation to the k-th contexts by using an equation $$b_{i_c}(k) = b_i(k) - \bar{b}(k);$$

wherein $b_{i_c}(k)$ is one of the k-th adjusted contexts, $b_i(k)$ is one of the k-th contexts, $\bar{b}(k)$ is the k-th weighted expectation value, and i is an integer larger than 0 and equal to or less than N.

14. The computing device of claim 11, wherein the reinforcement learning agent calculates the k-th weighted expectation value by using an equation $$\bar{b}(k) = \Sigma_{i=1}^N \pi_i(k) b_i(k);$$

wherein $\pi_i(k)$ is one, corresponding to an i-th behavior candidate, among the k-th behavior probabilities, and $b_i(k)$ is one of the k-th contexts.

15. The computing device of claim 11, wherein the reinforcement learning agent (i) adjusts a k-th regression parameter matrix by using at least part of the k-th adjusted contexts and the k-th behavior probabilities, to thereby generate a (k+1)-th regression parameter matrix, (ii) adjusts a k-th dependent variable by using at least part of the k-th adjusted contexts and the k-th reward, to thereby generate a (k+1)-th dependent variable, and (iii) generates the probability distribution for estimating the (k+1)-th behavior by referring to the (k+1)-th regression parameter matrix and the (k+1)-th dependent variable; and wherein the k-th regression parameter matrix is a matrix formed by regression parameters to be used for linear regression estimation, and the k-th dependent variable is to be estimated by the linear regression estimation.

16. The computing device of claim 15, wherein the reinforcement learning agent adjusts the k-th regression parameter matrix by using an equation $$B_{k+1} = B_k + 2b_{a(k)_c}(k) \times b_{a(k)_c}(k)^T + 2\Sigma_{i=1}^N \pi_i(k) \times b_{i_c}(k) \times b_{i_c}(k)^T;$$

wherein $B_{k+1}$ is the (k+1)-th regression parameter matrix, $B_k$ is the k-th regression parameter matrix before being adjusted, $b_{a(k)_c}(k)$ is one of the k-th adjusted contexts corresponding to the selected k-th behavior, $\pi_i(k)$ is one, corresponding to an i-th behavior candidate, among the k-th behavior probabilities, and $b_{i_c}(k)$ is one, of the i-th behavior candidate, among the k-th adjusted contexts.

17. The computing device of claim 16, wherein when k equals one a first regression parameter matrix is a unit matrix with a dimension identical to that of 1-st contexts.

18. The computing device of claim 15, wherein the reinforcement learning agent adjusts the k-th dependent variable by using an equation $$y_{k+1} = y_k + 4b_{a(k)_c}(k) \times r_{a(k)}(k);$$

wherein $y_{k+1}$ is the (k+1)-th dependent variable, $y_k$ is the k-th dependent variable before being adjusted, $b_{a(k)_c}(k)$ is one among the k-th adjusted contexts corresponding to the k-th behavior, and $r_{a(k)}(k)$ is the k-th reward corresponding to the k-th behavior.

19. The computing device of claim 18, wherein when k equals one a first dependent variable is a zero vector with a dimension identical to that of 1-st contexts.

20. The computing device of claim 15, wherein the reinforcement learning agent generates the probability distribution for estimating the (k+1)-th behavior by using an equation $$N_{k+1} = N(\hat{\mu}_{k+1}, \sigma^2 B_{k+1}^{-1})\ \text{when}\ \hat{\mu}_{k+1} = B_{k+1}^{-1} y_{k+1};$$

wherein $B_{k+1}$ is the (k+1)-th regression parameter matrix, $y_{k+1}$ is the (k+1)-th dependent variable, and σ is a preset variance-adjusting value related to a degree of exploration.

* * * * *